United States Patent [19]

George et al.

[11] Patent Number: 4,529,943

[45] Date of Patent: Jul. 16, 1985

[54] RAMAN ACCUMULATOR AS A FUSION LASER DRIVER

[75] Inventors: E. Victor George; James C. Swingle, both of Livermore, Calif.

[73] Assignee: The United States of America as represented by the Department of Energy, Washington, D.C.

[21] Appl. No.: 363,971

[22] Filed: Mar. 31, 1982

[51] Int. Cl.³ .......................... H01S 3/22; H03F 7/00
[52] U.S. Cl. ........................................ 330/4.3; 372/3; 307/426
[58] Field of Search ............... 330/4.3; 372/3, 20, 372/21; 307/426

[56] References Cited

U.S. PATENT DOCUMENTS

| | | | |
|---|---|---|---|
| 3,515,897 | 6/1970 | Culver | 307/426 |
| 3,705,992 | 12/1972 | Ippen et al. | 307/426 |
| 4,194,170 | 3/1980 | Kurnit | 372/3 |
| 4,224,577 | 9/1980 | Kurnit | 307/426 |
| 4,306,195 | 12/1981 | Stappaerts | 307/426 |
| 4,387,344 | 6/1983 | Meyer | 330/4.3 |
| 4,389,617 | 6/1983 | Kurnit | 372/3 |

OTHER PUBLICATIONS

Ewing et al, "Optical Pulse Compressor Systems for Laser Fusion", 5/79, pp. 368-379, IEEE, J.Q.E., vol. QE-15, #5.

Primary Examiner—Nelson Moskowitz
Attorney, Agent, or Firm—John F. Schipper; Charles E. Lykes, Jr.; Judson R. Hightower

[57] ABSTRACT

Apparatus for simultaneous laser pulse amplification and compression, using multiple pass Raman scattering in one Raman cell and pulse switchout from the optical cavity through use of a dichroic device associated with the Raman cell.

9 Claims, 18 Drawing Figures

RAMAN ACCUMULATOR AS A FUSION LASER DRIVER

FIELD OF THE INVENTION

This invention relates to laser pulse amplification and temporal compression apparatus. The United States Government has rights in this invention pursuant to Contract W-7405-ENG-48 between the U.S. Department of Energy and the University of California for the operation of Lawrence Livermore National Laboratory.

BACKGROUND OF THE INVENTION

The use of Raman or other scattering for purposes of tailoring a light beam pulse (tuning, amplification, pulse shaping) has been considered occasionally in the literature. One peripheral use is described in U.S. Pat. No. 3,516,744, issued to Hinman, Slomba and Stoddart for a Raman laser beam sampling cell or spectrometer, wherein the beam makes multiple passes through a Raman sampling cell and the resulting Raman radiation is collected at a non-zero angle (e.g., 90°) relative to the beam propagation direction. The scattered radiation thus measured is not used for any other purpose, and the multiple passes of the beam through the cell are not synchronized.

A laser pulse compression or shaping system is taught by Brienza and Treacy in U.S. Pat. No. 3,549,256, wherein a negatively chirped pulse and a positively chirped pulse are generated (of equal intensity, but differing in phase) by means of a rotating mirror forming one end of two side-by-side optical cavities that generate the two initially similar pulses. Using a laser gas with a narrow spectral range so that only one mode is within the gas gain band at any instant, Brienza et al find that single dominant mode present in the combined chirped pulses sweeps across the gain bandwidth in a time of order of 1 $\mu$sec for mirror rotations of the order of 30 cps; and this limits the length of an output pulse from the system, possibly resulting in pulse compression.

Pantell and Puthoff, in U.S. Pat. No. 3,624,421, disclose and claim a tunable Raman laser, using a crystal that is both Raman active and infrared active and has a preferred axis that is controllably oriented at a non-zero angle $\theta$ relative to the axis of the laser pump, with the crystal preferred axis coinciding with the optical cavity in which the crystal is positioned. By suitable choice of the angle $\theta$, the laser pump (at the Raman frequency) generates first order Stokes radiation propagating in the crystal parallel to the optical cavity axis, and this Stokes radiation is amplified by successive passes through the crystal. As $\theta$ is varied, the output frequency from the optical cavity varies continuously, thus affording a tunable Raman laser. The length of the Raman pump pulse is not controlled, each such pulse makes only one pass through the crystal, and passage of the Raman pump pulse and Stokes radiation through the crystal are not synchronized.

U.S. Pat. No. 3,657,554 to Lumpkin and Shiren teaches a technique for generating super-radiant, short laser pulses, utilizing adiabatic rapid passage of an optical transition (electric dipole) in atoms in an optically resonant medium. The invention requires (1) that the atomic population be substantially fully inverted and (2) that the seed pulse duration be much shorter than the relaxation time of the medium so that little spontaneous decay occurs. The (giant) pulse produced by such an amplifier is then passed through an electro-optical crystal such as LiNbO$_3$ where the carrier frequency is modulated so as to excite Raman transitions in fluoro-nitrobenzene, contained in a Raman cell through which the pulse then passes. Super-radiant laser pulses then issue from the Raman cell, the result of adiabatic rapid passage of the 4 $^2S_{\frac{1}{2}} \rightarrow$ 4 $^2P_{3/2}$ transition in the Raman cell. No special use is made of any Stokes radiation generated, and the system is not a multipass or regenerative laser system.

A technique for compression of optical laser pulses is taught by U.S. Pat. No. 3,720,884 issued to Kelley, Fisher and Gustafson. A short optical pulse is passed through a Kerr cell, having a nonlinearity relaxation time << the seed pulse duration, $\Delta t$; and the Kerr cell material produces a positive chirp on the optical pulse passing therethrough that spreads the frequency band of the unmodulated pulse, which is no longer monochromatic, thereby temporally compressing the optical pulse to perhaps $10^{-13}$ sec. Here, according to the inventors, the stimulated Raman effect is to be avoided as it interferes with self-phase modulation in the Kerr cell.

A laser system employing anti-Stokes radiation, which is a concomitant of Raman scattering, for production of high power laser pulses is disclosed and claimed in U.S. Pat. No. 3,815,043, issued to Carman and Rhodes. In one embodiment, an oscillator produces radiation at an initial wavelength $\lambda_1$, which is amplified by a first amplifier and directed through an electron beam-pumped Raman cell to produce anti-Stokes radiation of wavelength $\lambda_2 < \lambda_1$ by forward Raman scattering. The input radiation is directed through the Raman cell at a time (approximately 1 $\mu$sec after electron beam pumping begins) corresponding to maximum inversion density in the Raman cell medium (e.g., CO$_2$ gas) so that maximum stored energy is available for Raman scattering and Stokes conversion in the gas. The process requires use of a high intensity, short duration ($\Delta t \lesssim 0.3$ nsec) input pulse to efficiently convert part of the stored Raman cell energy to, say, first order anti-Stokes radiation that then propagates at a predetermined angle relative to the propagation direction of the input pulse. This system does not contemplate multipass or regenerative use of either the input pulse or the anti-Stokes radiation pulse thus produced, and it requires use of a short duration ($\Delta t \lesssim 0.3$ sec) input pulse for efficient operation.

U.S. Pat. No. 4,039,851, issued to Jain, Lin and Stolen teaches the use of optically dispersive Raman scattering in an optical fiber to disperse (in time) a Stokes radiation pulse produced in the fiber. The frequency- and temporally-dispersed Stokes radiation pulse is multiply passed through the fiber in synchronism with additional seed pulses produced by a laser pump, and pulse components with the particular frequency desired are enhanced relative to all other frequencies. The invention uses synchronized multiple passes of the Stokes pulse primarily for dispersion discrimination in favor of one frequency or narrow band of frequencies, rather than for energy amplification or transfer of energy from one wavelength to another.

SUMMARY OF THE INVENTION

The invention allows laser pulse amplification, using Raman scattering to simultaneously amplify the chosen laser pulse and to shorten the pulse length by an arbitrary factor $K_{AC} \approx 1-3$. The invention also provides a means of switching the amplified pulse out of the optical cavity.

One object of the invention is to provide apparatus for simultaneous amplification and compression of a laser pulse, using Raman scattering processes.

Another object is to provide apparatus for switching an amplified pulse out of an optical cavity.

Other objects of the invention and advantages thereof, will become clear by reference to the detailed description and the accompanying drawings.

In one embodiment, the invention may comprise a rare gas halide pump amplifier for producing a Raman pump beam at characteristic frequency $\nu_p$; a Raman cell, positioned to receive the Raman pump beam and to return the Raman pump beam to the pump amplifier after extraction of energy from the Raman pump beam in the Raman cell by a counter-propagating Stokes wave of characteristic frequency $\nu_S$, with the Raman cell length having substantially 25% of the overall length L of the pump amplifier-Raman cell configuration; a mosaic prism or other dichroic device positioned at the end of the Raman cell closest to the pump amplifier so as to deflect a pulse at a characteristic frequency $\nu_S$ by a non-zero angle relative to the direction of propagation of the Raman pump pulse; and a highly reflective mirror positioned at a distance L/2 from the far end of the Raman cell so as to receive and reflect at normal incidence a Stokes wave pulse of frequency $\nu_S$ issuing from the mosaic prism.

Another embodiment replaces the highly reflective mirror of the first embodiment by a second Raman cell, positioned to receive the pulse of characteristic frequency $\nu_s$ from, and return the pulse to, the first Raman cell after extraction of energy from the pulse to convert the energy to radiation energy at frequency $\nu_{2S}$, with the second Raman cell having length $L/4K_{ac}$ ($1 < K_{ac} < 3$) and with the path length of the pulse from the far end of the first Raman cell to the end of the second Raman cell furthest from the first Raman cell being substantially L/2; and a second dichroic device positioned at the end of the second Raman cell closest to the first Raman cell so as to deflect a pulse of characteristic frequency $\nu_{2S}$ by a non-zero angle relative to the direction of propagation of a pulse having a characteristic frequency $\nu_s$ (represented by FIG. 10).

In a third embodiment, the invention may comprise: a pump amplifier containing a pump amplifier gas and having a longitudinal axis and including a fully reflecting mirror at one end thereof, for producing a Raman pump beam of characteristic frequency $\nu_p$; a first Raman cell containing a Raman cell gas and having a longitudinal axis and two fully reflecting side walls substantially parallel to each other and to the longitudinal axis of the Raman cell, with the Raman cell longitudinal axis being oriented at a first predetermined angle $\theta_1 > 0$ relative to the direction of the pump amplifier longitudinal axis, the cell being positioned so that one Raman cell reflecting wall receives the pump beam from the pump amplifier and reflects the pump beam to the second reflecting wall of the first Raman cell, with the pump beam being alternately reflected from the first and second reflecting walls of the first Raman cell until the pump beam exits from the end of the first Raman cell furthest from the pump amplifier, for extraction of energy from the pump beam to convert pump beam energy of frequency $\nu_p$ to beam energy of frequency $\nu_S$; a first oblique fully reflecting mirror, positioned adjacent to the end of the first Raman cell furthest from the pump amplifier, to receive the pump beam issuing from the cell end and to reflect the beam at substantially normal incidence and return the pump beam to the Raman cell, with the cumulative reflected path length from the pump amplifier mirror to the first oblique fully reflecting mirror being a predetermined number L and the length of the first Raman cell, measured along the cell longitudinal axis, being L/4; a first transverse fully reflecting mirror, positioned on the first Raman cell longitudinal axis and oriented substantially perpendicular to that axis, and positioned adjacent to the first oblique mirror so that any radiation beam issuing from the first Raman cell parallel to the cell longitudinal axis is reflected at substantially normal incidence from the first transverse mirror, returns to and propagates through the first Raman cell substantially parallel to the cell longitudinal axis, and exits from the first Raman cell at the cell end closest to the pump amplifier; a second Raman cell containing a second Raman cell gas having a longitudinal axis and two fully reflecting side walls substantially parallel to each other and to the longitudinal axis of the second Raman cell, with the second Raman cell longitudinal axis being oriented at a second predetermined angle $\theta_2 > 0$ relative to the first Raman cell longitudinal axis, the second Raman cell being positioned so that one reflecting wall of the second Raman cell receives the radiation beam of frequency $\nu_S$ exiting from the first Raman cell and reflects this beam to the second Raman cell second reflecting wall, with this beam being alternately reflected from the first and second reflecting walls of the second Raman cell until the radiation beam exists from the end of the second Raman cell furthest from the first Raman cell, for extraction of energy from this radiation beam to convert radiation beam energy at frequency $\nu_S$ to radiation beam energy of a different frequency $\nu_{2S}$; a second oblique fully relecting mirror, positioned adjacent to the end of the second Raman cell furthest from the first Raman cell to receive the radiation beam of frequency $\nu_S$ issuing from that end of the second Raman cell, and to reflect at substantially normal incidence and return that radiation beam to the second Raman cell, with the cumulative reflected path length from the second oblique mirror being a predetermined length $L_1$ and the length of the second Raman cell, measured along the second Raman cell longitudinal axis, being $L_1/4$; and a second transverse fully reflecting mirror, positioned on the second Raman cell longitudinal axis with mirror normal at a third predetermined angle $\theta_3$ relative to this longitudinal axis and positioned adjacent to the second oblique mirror, to receive a beam of radiation of frequency $\nu_{2S}$, issuing from one end of the second Raman cell substantially parallel to the longitudinal axis of that cell and to reflect that beam at substantially normal incidence and return it to the second Raman cell (represented by FIG. 11).

A fourth embodiment differs from the third embodiment only in that the first transverse fully reflecting mirror is now positioned adjacent to the end of the first Raman cell nearest to the pump amplifier, and the second Raman cell is positioned adjacent to the end of the first Raman cell furthest from the pump amplifier (represented by FIG. 12).

DETAILED DESCRIPTION

Figure 1:
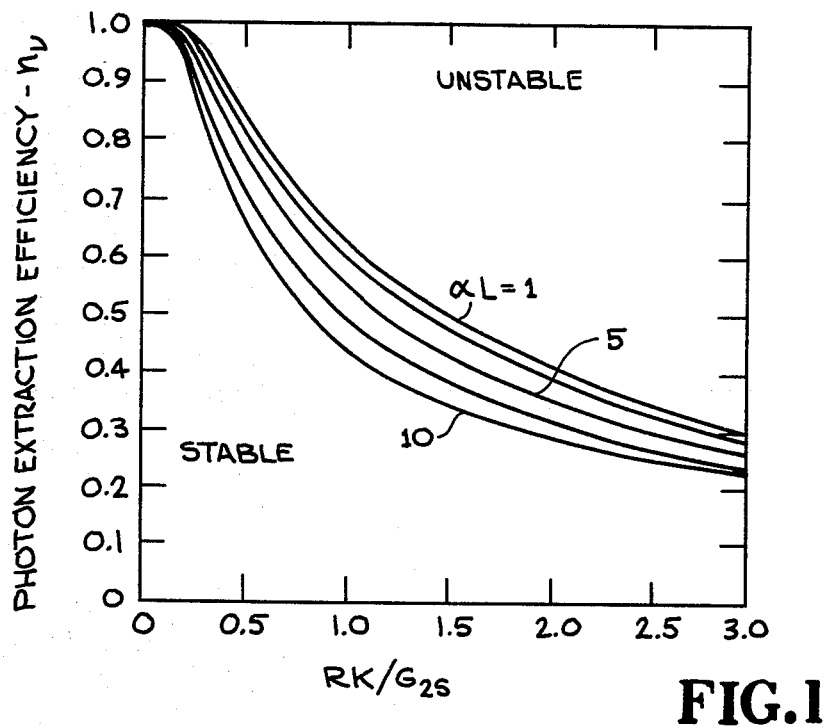
FIG. 1 is a graphical presentation of photon extraction efficiency in a Raman cell as a function of the variable temporal pulse compression divided by second Stokes wave gain, for several assumed values of Raman amplifier gain.

The use of a Raman cell driven by a pump amplifier such as a rare gas halide amplifier, is an attractive approach to relatively high efficiency production of laser pulses for use in a fusion laser driver. The principles of Raman amplification have been discussed in the background section and will not be repeated here. FIG. 1 exhibits the relationship between Raman cell extraction efficiency and the temporal pulse compression for several assumed values of Raman amplifier gain, consistent with predetermined limits on the undesirable growth of second Stokes waves in the amplification medium. This figure relates photon extraction efficiency $\eta_{ext}$ to R (forward-backward cross section ratio = 1.2–2 here), to K (temporal pulse compression = 1–3 here) and to $G_{2S}$ (maximum permissible gain coefficient for the second Stokes wave ≤ 20 here). For a given value of Raman gain, the operating point must lie in the lower left region in FIG. 1, or the growth of the undesirable second Stokes radiation occurs at an acceptable rate.

One suitable Raman cell gas is $CH_4$, for which a strong Raman transition is available at a Raman frequency $\nu_R = 1.08 \times 10^{13}$ Hz. This corresponds, for example, to a transition from a pump wavelength $\lambda_p = 2490$ Å (output wavelength of excited KrF) to a Stokes wavelength $\lambda_s \sim 2680$ Å, with an associated conversion efficiency of 92.9%. Other attractive Raman cell gases are $SiH_4$ and $GeH_4$, which behave qualitatively similarly.

Figure 2:
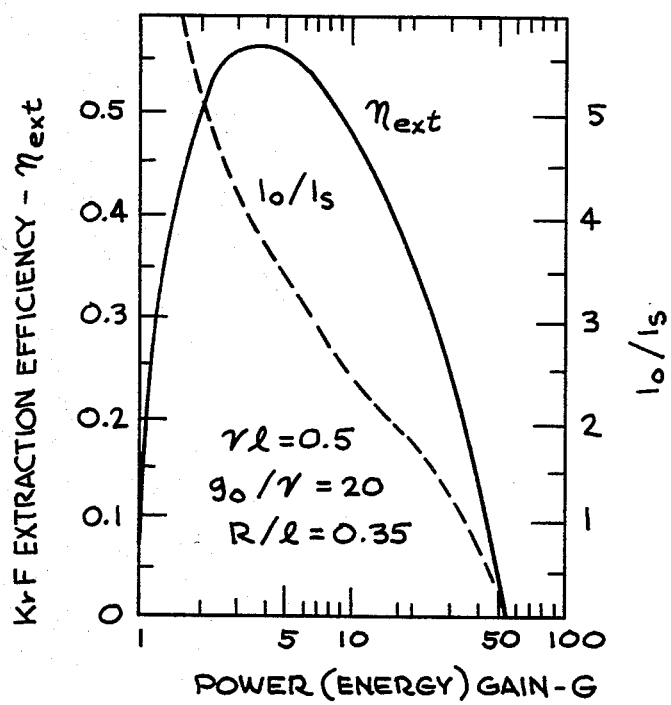
FIG. 2 is a graphical presentation of photon extraction efficiency for a KrF amplifier and the output intensity/saturation intensity ratio as a function of power gain (output intensity ÷ input intensity).

FIG. 2 exhibits extraction efficiency $\eta_{ext}$ for a KrF amplifier and the ratio of output intensity to saturation intensity $I_O/I_{sat}$ as a function of power gain G for a particular choice of medium parameters. One notes that $\eta_{ext}$ attains its maximum value, approximately 0.56, in the range of G = 3–4. Other appropriate Raman pump gases such as ArF, XeF, XeCl, $F_2$, FCl and $Cl_2$ should manifest similar qualitative behavior.

Figure 3:
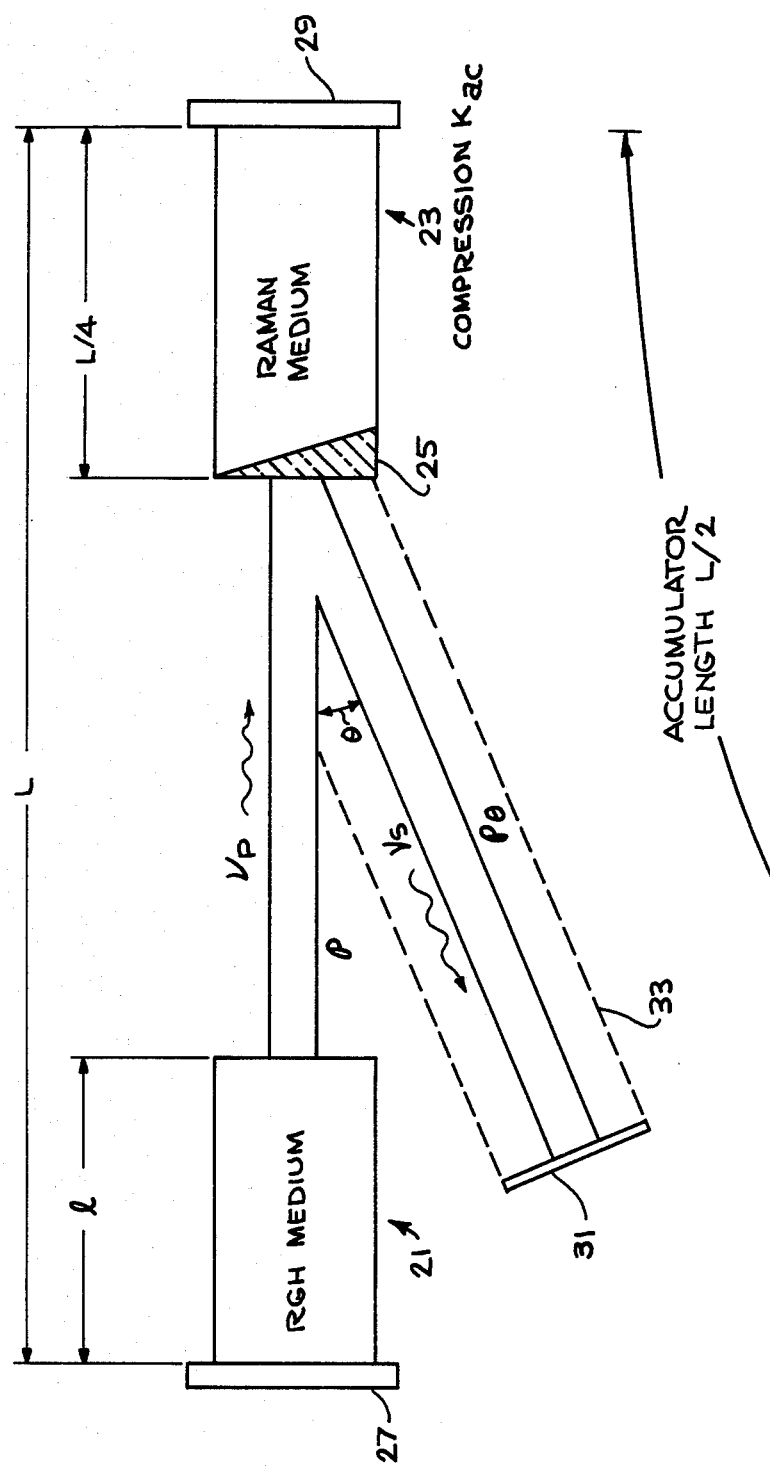
FIG. 3 is a schematic view of one embodiment of the Raman accumulator invention.

One embodiment of the subject invention, the Raman accumulator, is shown in FIG. 3. This embodiment comprises two coupled cavities, the first 21 containing an RGH pump amplifier and the second cavity 23 being a Raman cell having a mosaic prism array 25 at the cell end facing the pump amplifier. The Raman cell 23 is of length L/4, and fully reflecting mirrors 27 and 29 are spaced apart at distance L, for purposes of synchronizing the pump beam and the pulse to be amplified. The path length from the mirror 29 to an accumulator mirror 31 is L/2 as shown. An optical field for pump amplification is set up in the RGH amplifier so that the entire "cavity" of length L is filled with a beam of frequency $\nu_p$. A shorter pulse at the Stokes frequency, $\nu_S$, is then injected into the accumulator and extracts from the pump beam as the pulse passes through the Raman cell 23, with the pulse propagating away from the Raman cell 23 toward the mirror 31 along a path $P_\theta$ that is not collinear with the pump beam path P, as shown. The pump energy remaining in the Raman cell after extraction by the pulse is directed back to the RGH medium cell 21, and serves as input to the amplifier while pumping continues. The lengths of the overall cavity (L), the Raman cell (L/4) and the accumulator (L/2) are chosen so that the entire process occurs synchronously and repeatedly for a number of passes N through the system. The effective pump pulse width is given by the transit time $$\tau_t = L/C,$$

and the RGH amplifier is pumped for a time interval $$\tau_{RGH} = {}^N\tau_t (N = 1, 2, 3,)$$

The mosaic prism array may be replaced by any other means that separates rays of substantially different wavelengths in different directions, such as a grating or a single prism.

Figure 4:
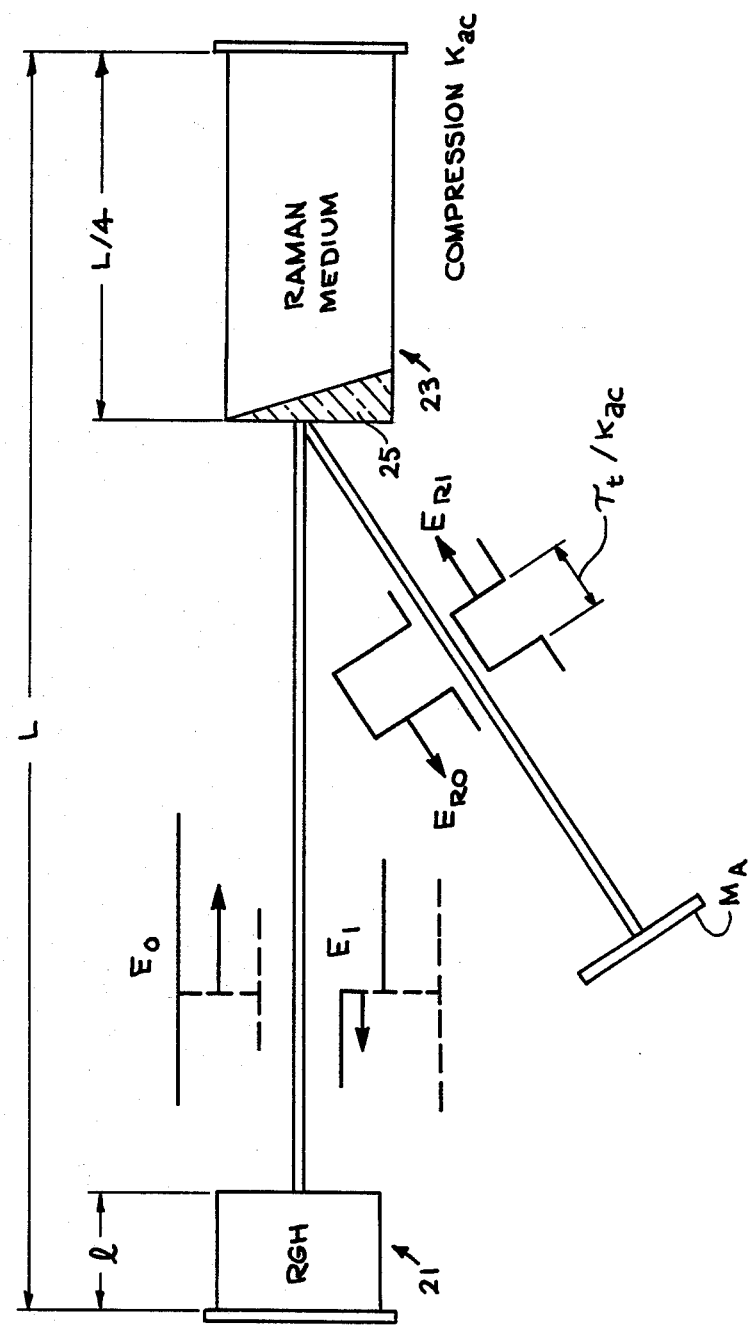
FIG. 4 is a schematic view of the embodiment of FIG. 3, illustrating the flows of energy between pump amplifier and Raman cell and between Raman cell and Stokes wave reflector.

To illustrate the sequence of events, it is useful to decompose the pump beam standing wave radiation field into two traveling waves, one moving to the left and one moving to the right as in FIG. 4. The total field then becomes a rightward-moving uniform field $E_0$ serving as input to the Raman cell and a depleted beam (step function dropping from magnitude $E_0$ to magnitude $E_1$) that moves to the left and serves as input to the RGH amplifier, where it is regenerated and sent back (as $E_0$) for further energy extraction by the pulse in the Raman cell. Energy is thus substantially continuously transferred from RGH cavity 21 to the Raman cell 23 and thence to accumulator cavity 33 (FIG. 3) by the Raman process. Ideally, the accumulator pulse will grow until it extracts all of the energy from the pump field, at which time the pulse can be extracted and directed to the target.

Within the Raman accumulator cavity 33, the pulse has a temporal compression factor $K_{AC}$ (-1) so that the amplified pulse moving away from the Raman cell and toward the mirror 31 has pulse width $\tau_t/K_{AC}$ as shown. This pulse is substantially perfectly reflected by the mirror 31, and moves back toward the Raman cell 23 for further amplification by the pump beam. The Raman extraction efficiency $\eta_R$ is given by the product $$\eta_R = \frac{\nu_S}{\nu_p} \eta_\nu,$$

where $\eta_\nu$ is the photon extraction efficiency and $\nu_S/\nu_p$ is the quantum defect (0.93 for pump-to-first Stokes wave in methane). The RGH device extraction efficiency, $\eta_{RGH}$, and device gain, G, are related by $$\eta_{RGH} = (RGH \text{ production efficiency})\eta_{ext}$$

so that the overall Raman accumulator device efficiency becomes $$\eta_{device} = \frac{\nu_S}{\nu_p} \eta_{RGH}$$

In external Raman compressors, the energy that remains in the pump beam optical field after Raman extraction is wasted; but with the Raman accumulator proposed here, this energy is used as input to the RGH amplifier and thus contributes to the increased efficiency of the accumulator.

Figure 5:
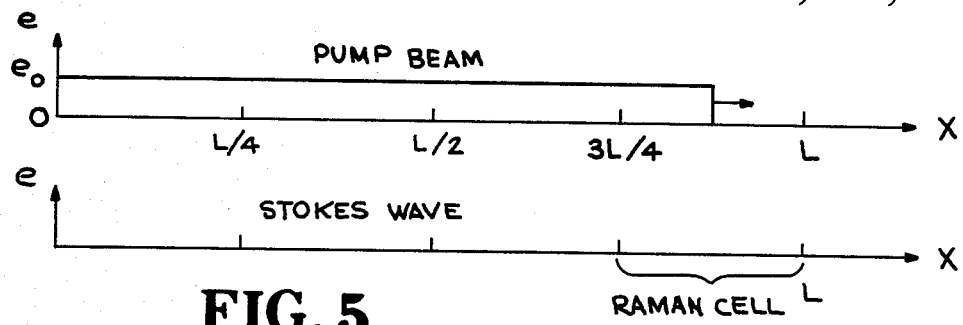
FIGS. 5, 6, 7 and 8 are graphical presentations of the spatial distribution of pump beam and Stokes wave pulse at four consecutive time points as the pump beam and/or the Stokes wave pulse pass through the Raman cell.
Figure 6:
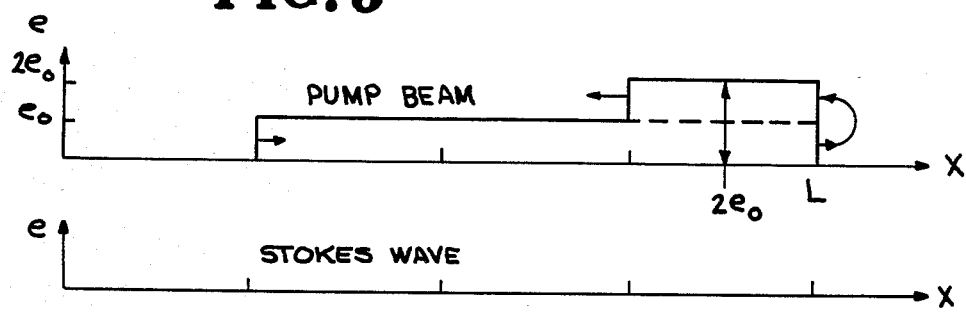
Figure 7:
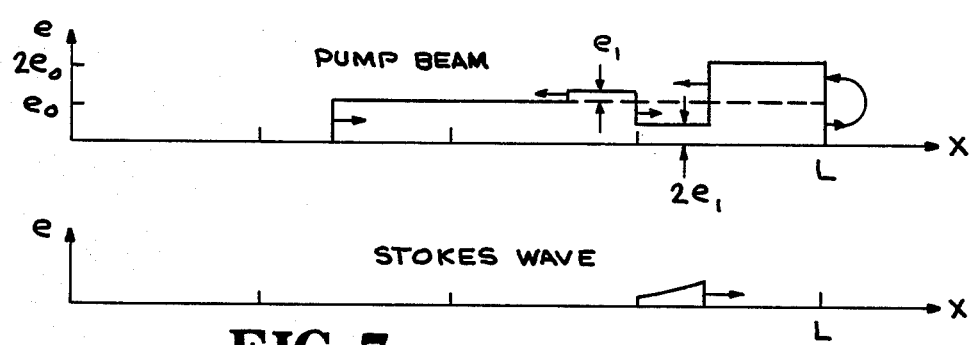
Figure 8:
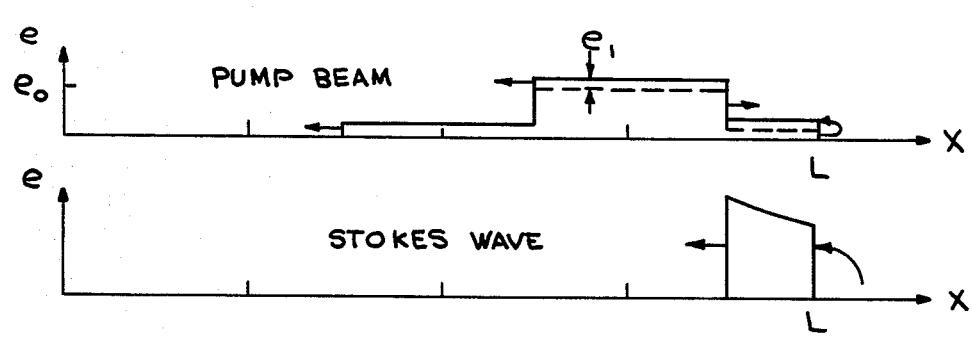

FIGS. 5, 6, 7 and 8 exhibit the spatial distribution of energy in the leading edge of the pump wave and in the leading edge of the Stokes wave (the latter only within the Raman cell 23) at four consecutive times after the time (t=0) the leading edge of the pump pulse first enters the Raman cell:

FIG. 5 $t = t_0$ $(0 < t_0 < L/4C)$;
FIG. 6 $t = t_1 = L/2C$;

FIG. 7 $t = t_2 \left( L/2C < t_2 < \frac{3L}{4C} \right)$;

FIG. 8 $t = t_3 \left( \frac{3L}{4C} < t_3 < \frac{L}{C} \right)$.

In FIG. 5, the pump pulse has traveled toward the right approximately half the length (L/4) of the Raman cell 23 in one direction, and the Stokes wave has not yet entered the Raman cell. In FIG. 6, the pump pulse has traveled the length of the Raman cell, has been reflected by the mirror 29, and has traveled a distance d=L/2 toward the left to the front end of the Raman cell. At the time t=t_1, the leading edge of the Stokes wave pulse enters the Raman cell at the left end and proceeds toward the right, opposite to the direction of travel of the leading edge of the pump pulse.

In FIG. 7, the leading edge of the pump pulse has moved further leftward a distance $\Delta x \cong L/8$, and the leading edge of the Stokes wave pulse (which moves at substantially the same speed as the pump pulse leading edge) has moved to the right a distance $\Delta x \cong L/8$ within the Raman cell. As the stokes wave moves through the counter-propagating pump pulse, the Stokes wave energy is amplified (initially exponentially, consistent with small signal gain theory) as it progresses the through Raman cell; and this results in depletion of the pump pulse energy from $E_0$ to $E_1$ over the partial length $\Delta X_p \cong L/4$ of the pump pulse that has passed through the interacted with the Stokes wave.

Finally, in FIG. 8, the leading edge of the pump pulse has moved leftward a distance $\Delta x \cong 3L/8$ from the Raman cell, while the Stokes wave pulse has moved rightward through the Raman cell, has been reflected by the mirror 23, and has moved leftward through the cell a distance $\Delta x \cong L/8$, with a concomitant depletion of pump pulse energy over the partial length $\Delta x_p \cong 3L/4$ of the counter-propagating pump pulse through which the Stokes wave has passed.

The Stokes wave pulse may have any length $L_S < L/2$, and the temporal compression factor of such pulse is $K_{AC} = L/2L_S$ ($\approx 1-3$ here).

Figure 9:
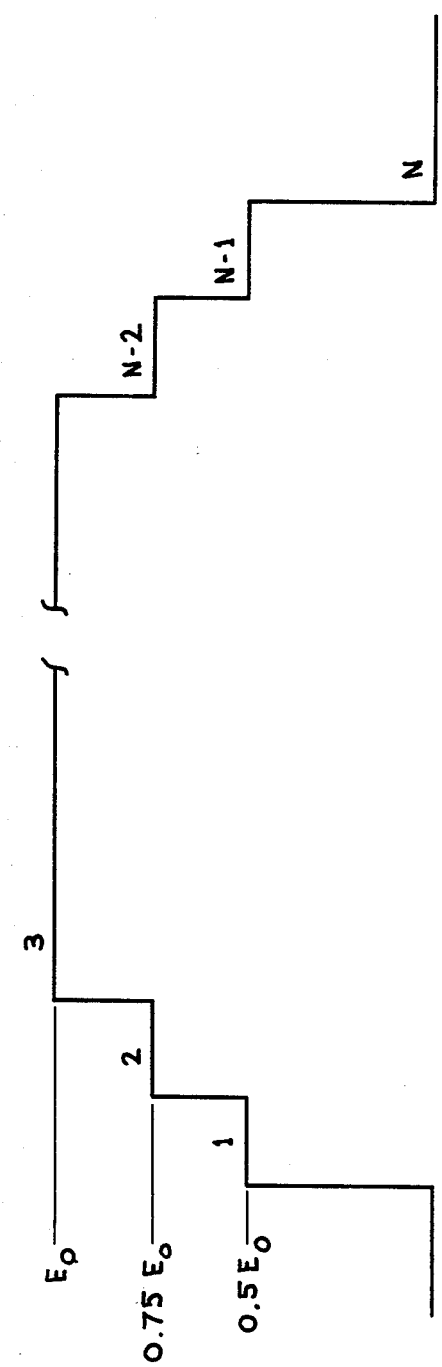
FIG. 9 is a graphical presentation of pump beam energy rise and fall as a function of the cycle number of the recycled beam, for a substantially optimally tailored pump beam.

The finite rise and fall times on the pulsed power system can result in more efficient energy extraction in the accumulator system, vis-a-vis other systems where extraction is substantially off optimum during these periods. As the accumulator pulse begins the extraction process, little energy is extracted from the RGH cavity. If the pump beam pulse were square, this excess input intensity from the RGH amplifier to the pump beam would result in gain below the level at which optimum extraction occurs as indicated in FIG. 2. But with a finite rise time on the pump beam as, for example, shown in FIG. 9, successively higher effective gains occur as the intensity increases, thus driving the amplifier in the direction of optimum extraction as the accumulator cavity energy increases. At the rear end of the pump pulse, as indicated schematically in FIG. 9, energy extraction by the (n-1)th accumulator pulse is considerable; and with a step function excitation condition, this would require a very large and wasteful power gain in the RGH amplifier. However, because the pumping at the rear end of the pump pulse is decreased, less output is required for optimum extraction; and the resulting smaller gain will more closely approximate the optimum gain. This concept has been tested quantitatively in a calculation using a Frantz-Nodvik equation to determine the output of the Raman accumulator for each successive pass, using the corresponding extraction efficiency in the RGH amplifier as determined from FIG. 2. The extraction efficiency in the accumulator was observed to increase rapidly on successive passes, ranging from 50% to 80% for much of the process; and the average RGH amplifier extraction efficiency is about 10% higher using the pump pulse shape shown in FIG. 9 as compared to the usual square wave pulse.

Figure 10:
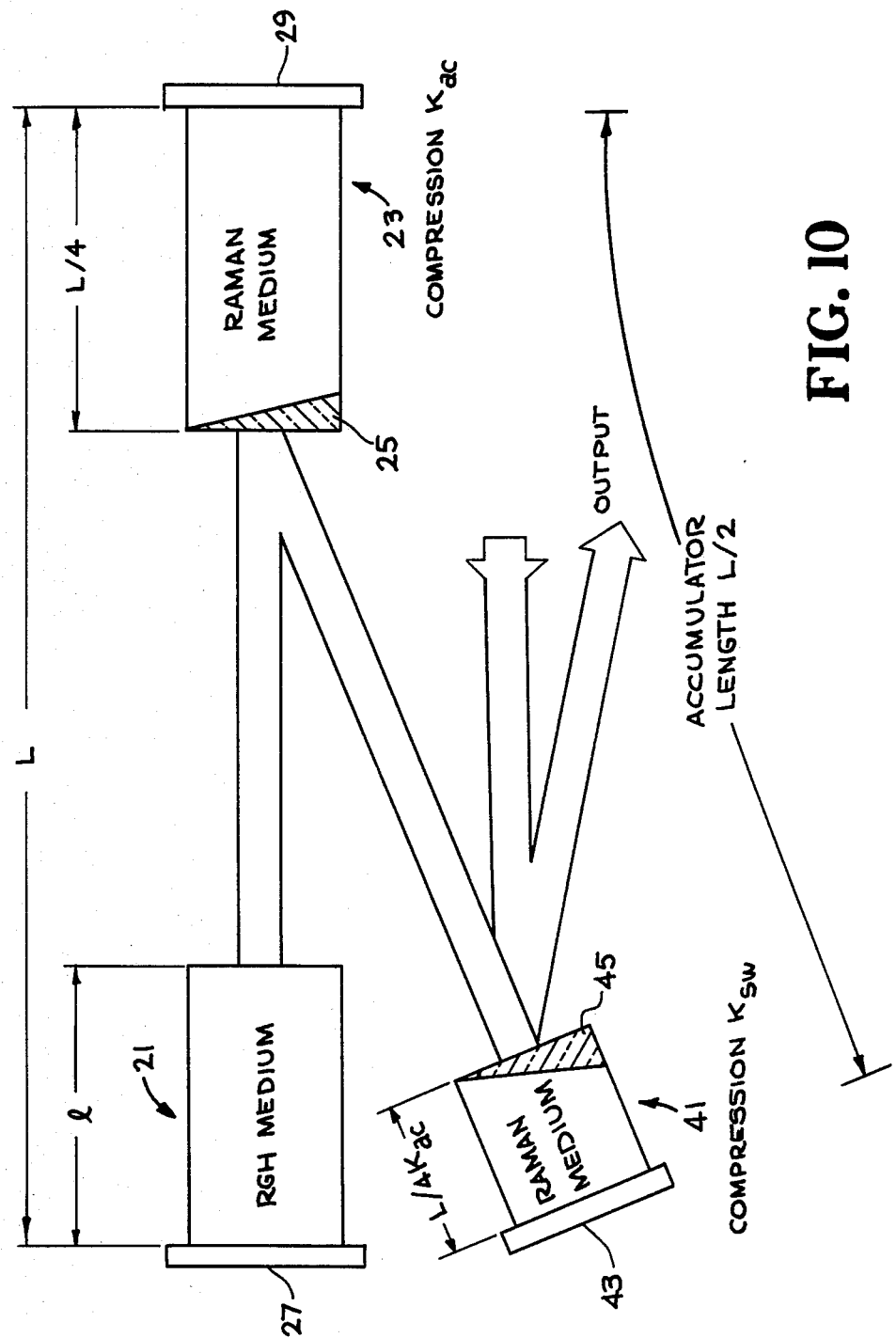
FIG. 10 is a schematic view of a second embodiment of the invention, including use of a second Raman medium for switching the Stokes wave pulse out.

A second embodiment of the subject invention includes a Raman switch in the configuration shown in FIG. 10, for switching the accumulator pulse out of its cavity. This embodiment incorporates a second Raman cell 41 including a rear mirror 43 and a prism or other dichroic device 45 for frequency-dependent deflection, as shown, with the accumulator pulse being used as the pump for this medium; and extraction from the second Raman cell occurs at the second Stokes frequency in a single or double pass process. This embodiment also offers the option of additional compression by a controllable factor $K_{SW}$ during the switchout phase. Switchout begins at the end of the accumulator extraction process, and $K_{SW}$ should be chosen near unity in order to obtain high extraction efficiency in the switch.

The length of the switch medium, $L/4K_{ac}$, is somewhat shorter than the length of the first Raman cell.

Figure 11:
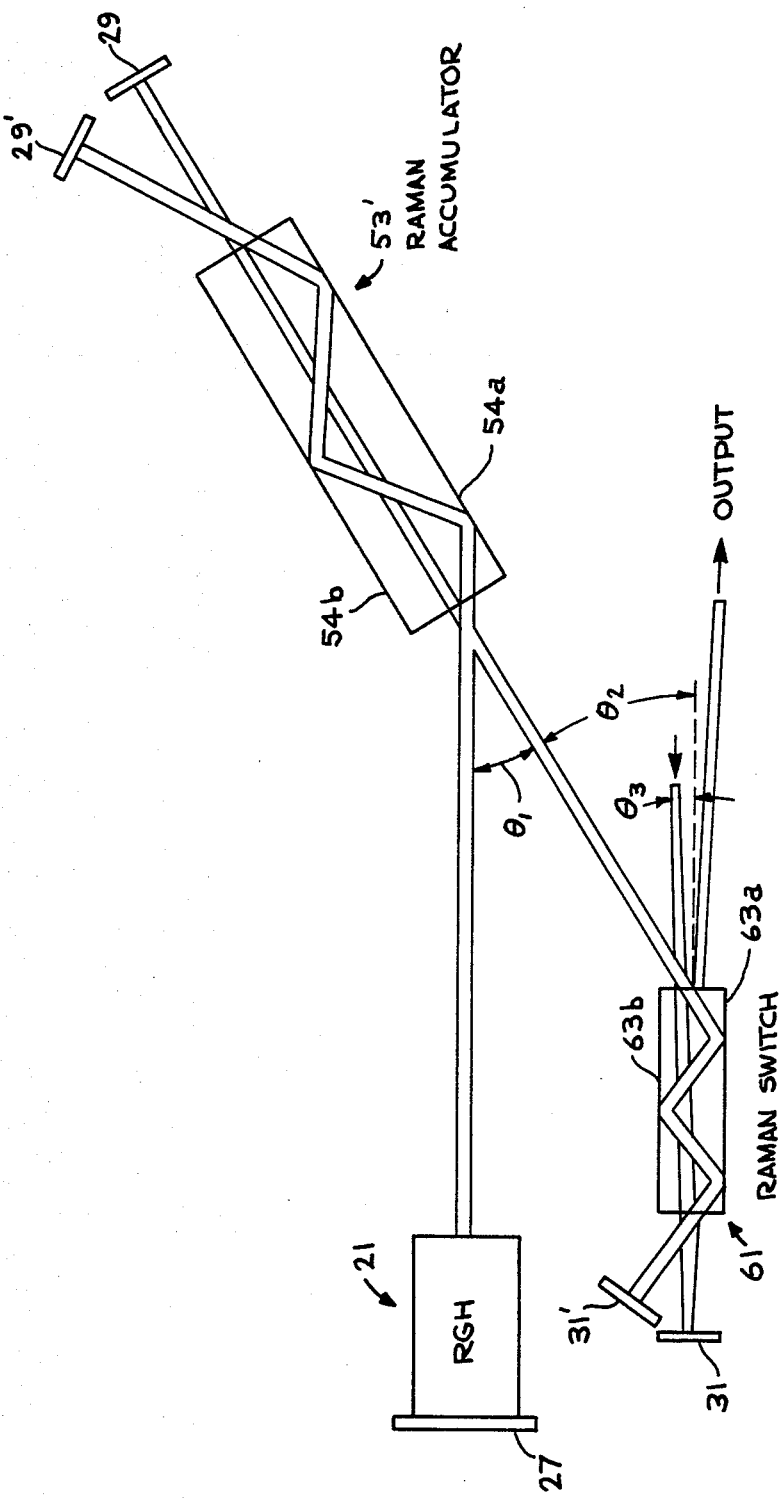
FIG. 11 is a schematic view of a third embodiment of the invention, including use of Raman cells with reflective side walls.

FIG. 11 exhibits a variation on the Raman switchout scheme that allows excellent optical coupling between beams in the various Raman media. The mosaic prism at the front end of the first Raman cell 33 and second Raman cell 61 is replaced by two reflecting channel walls 54a,b and 63a,b surrounding each of the Raman media so that the pump and Stokes radiation in each Raman cell moves obliquely through the corresponding Raman extraction pulse. The reflecting channel walls are not particularly susceptible to optical damage because of reduced pump pulsed fluences at the oblique angle, vis-a-vis, normal incidence.

Figure 12:
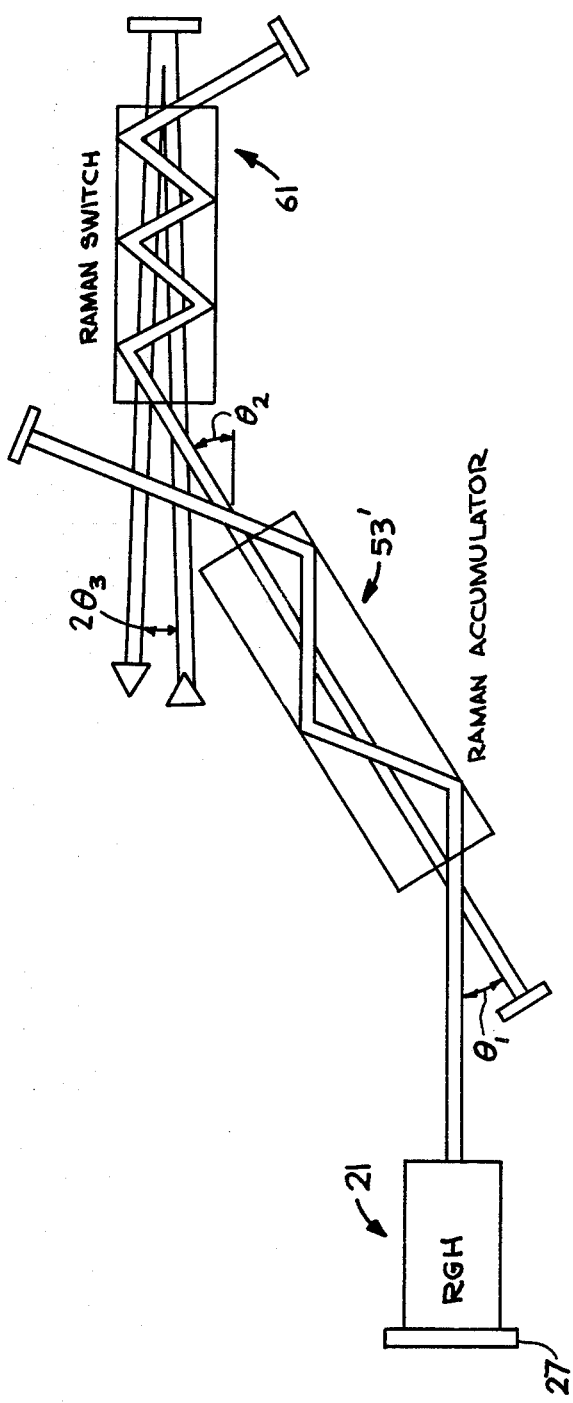
FIGS. 12, 13 and 14 are schematic views of alternative means of introducing a pump pulse into the optical cavity defined by the pump amplifier and the (first) Raman cell.
Figure 13:
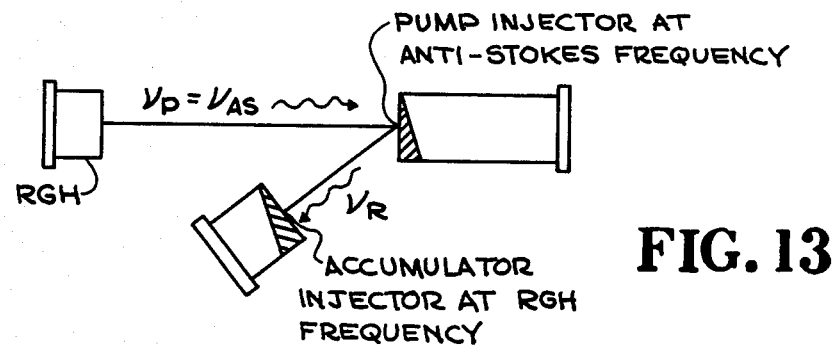
Figure 14:
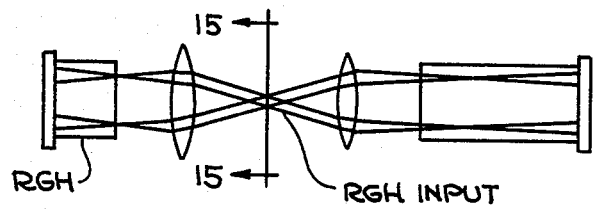

FIGS. 12, 13 and 14 exhibit three pulse injector schemes useful with the Raman accumulator and/or Raman switchout system. In FIG. 12, the initial RGH beam is generated by forward Raman scattering in the accumulator cell at the first anti-Stokes frequency, with the corresponding first Stokes pulse in the accumulator cavity then being the Raman frequency itself. Reasonable optical coating dichroism is required with this scheme.

Figure 15:
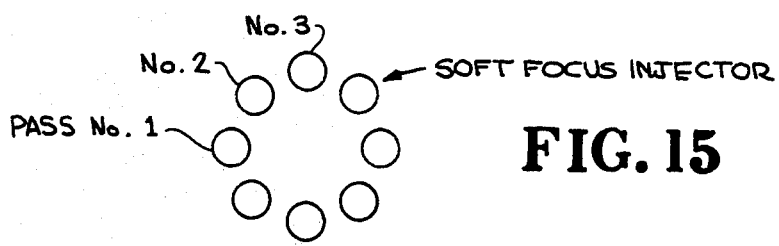
FIG. 15 is an end view of a soft focus injector used with the pump pulse injection apparatus of FIG. 14.

In FIG. 13, injection at the desired wavelength occurs at the focus of a spatial filter AA as shown; and the focal point in the spatial filter follows some trajectory, say linear or circular, as successive passes occur through the filter, with no two passes occurring through the same spatial filter aperture. See FIG. 15 for an end view of the spatial filter AA itself showing the aperture for passage.

FIG. 14 represents a general class of injector schemes wherein a small injected pulse enters the cavity 71 through a small aperture 73 in a high reflectivity mirror or through an off-axis unstable resonator scheme, with the pulse beam trajectory then never returning to the point on the mirror at which injection occurs.

In calculations performed on the accumulator of the type described earlier, where the pulse injected into the accumulator cavity was approximately 16% of the saturation intensity, net energy gains of 20 were observed after 10 bounces and resulting temporal pulse compression was 45 ($K_{AC} \approx 3$, $K_{SW} \approx 1.5$, $N = 10$). From these results, we can estimate system efficiency.

Assume the lumped optical losses are 3% per pass for each cavity, resulting in about 5% distributed loss per pass in each cavity. The pulsed power is assumed to be delivered out of the Marx banks with efficiency $\eta_{pp} = 0.65$, consistent with other projections on pulsed power efficiency. For a two-pass geometry at a gain of 500 in the Raman switch, the extraction efficiency $\eta_{SW}$ is taken to be 0.93. The quantum defect ratio in methane from KrF to first Stokes ($\nu_{1S}/\nu_p$) is 0.92 and from first to second Stokes ($\nu_{2S}/\nu_{1S}$) is 0.92. The Krf medium is characterized by an average extraction efficiency of 0.5 and a production efficiency of 0.25 resulting in the overall RGH amplifier efficiency $\eta_{RGH}$ of 0.125. The total accumulator system efficiency is then $$\eta_{SYS} = \eta_{RGH} \left( \frac{\nu_{1S}}{\nu_P} \frac{\nu_{2S}}{\nu_{1S}} \right) \eta_{pp}\eta_{SW} = 0.066$$

More optimistically, if one assumes pulsed power efficiency of 0.8 and a 40% improvement in $\eta_{RGH}$ due to operation of the RGH medium (e.g., KrF) at elevated temperatures, the overall system efficiency increases to $\eta_{SYS} = 0.114$. Thus, system efficiencies of 6.6 - 11.4% seem feasible here for temporal compressions of ~45.

Figure 17:
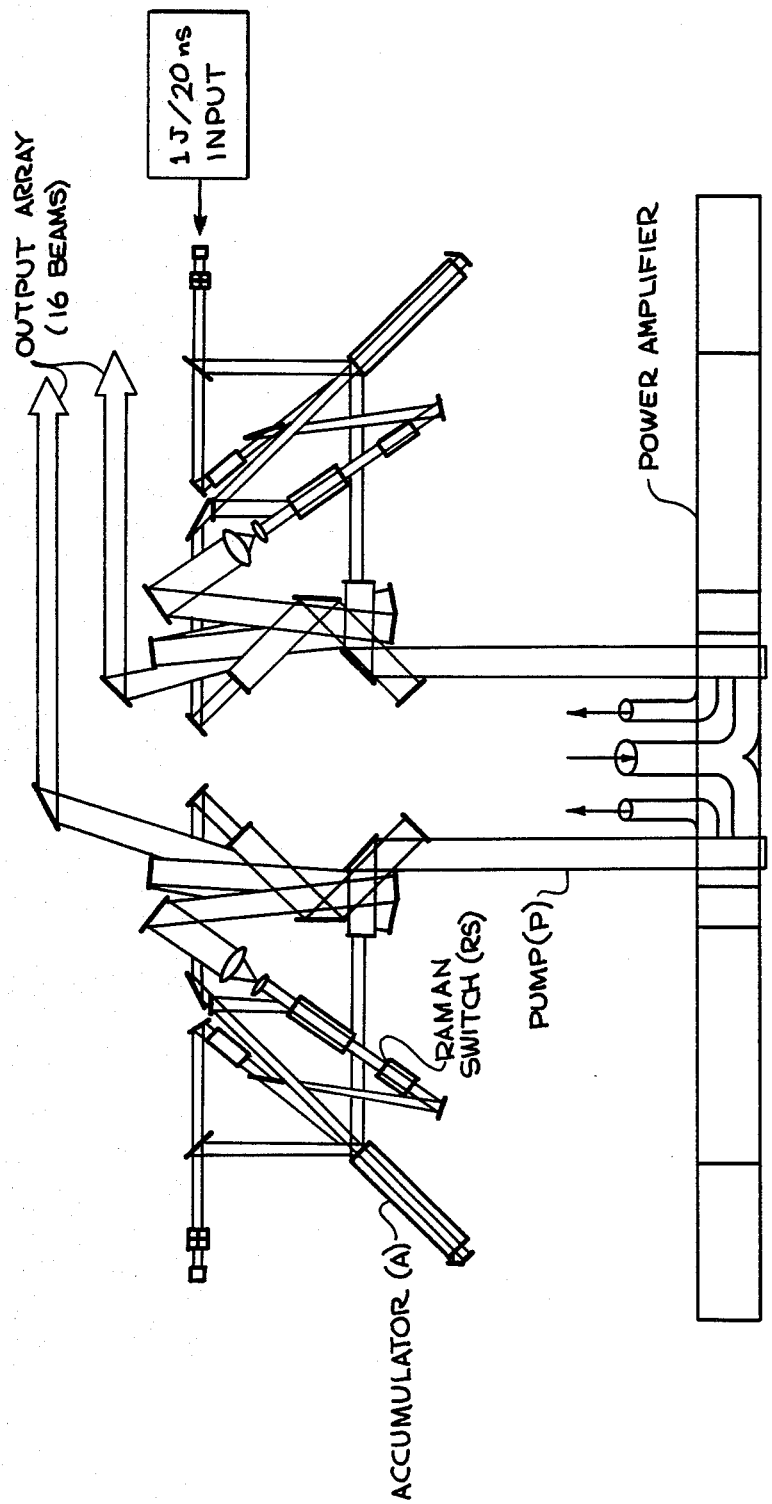
FIG. 17 is a schematic view of the arrangement of the KrF 1 μsec pulsed power of one of the 16 sections of the apparatus.

FIG. 17 depicts a laser system in the two megajoule class which uses the concepts described above, shows two of the sixteen 125 kJ beam lines. The pump medium (e.g., KrF, ArF, XeF, XeCl or $F_2$ or $FC_1$ or $Cl_2$) is assumed to be an annular region 10 m outside diameter, 6 m inside diameter and 3 m length. The medium is divided into 16 sections, each one being pumped through the outer surface of the annulus by the radially converging pulsed power segment shown in FIG. 17. The pulsed power source (e.g., a Marx bank of capacitors of conventional design) delivers a 1 MeV electron beam of 1 $\mu$sec pulse duration; the appropriate stand-off distances in the water striplines and diode insulators were calculated. The annular geometry provides for side scattering of electrons into adjacent gain media through thin foil structures suitably blackened for parasitic control by well known oxide coatings.

Figure 16:
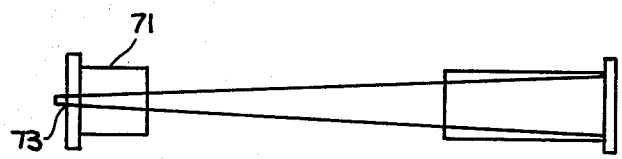
FIG. 16 is a schematic view of a fourth embodiment of the invention, including the use of folded Raman accumulator and switch cells cylindrically in 16 sections for this example, arranged to provide a large energy output pulse.

Turning to FIG. 16, the Raman media used in the accumulator and Raman switch are shown folded together above the pump amplifier. The Raman switch involves an extraction loop comprising two round trip passes to produce the final output beam, as indicated. Only one alignment and control system is required for each 125 kJ beam line. The various injecor pulses are generated in forward scattering Raman media arrayed to the outside of each accumulator. Each 125 kJ module requires approximately 6 kJ of KrF laser energy to provide injection at the various wavelengths required. Oscillator signals of approximately 1 J in 20 ns are required to start the process in each module. A separate small front end machine is probably required to generate the second Stokes input to the Raman switch at the appropriate time.

Figure 18:
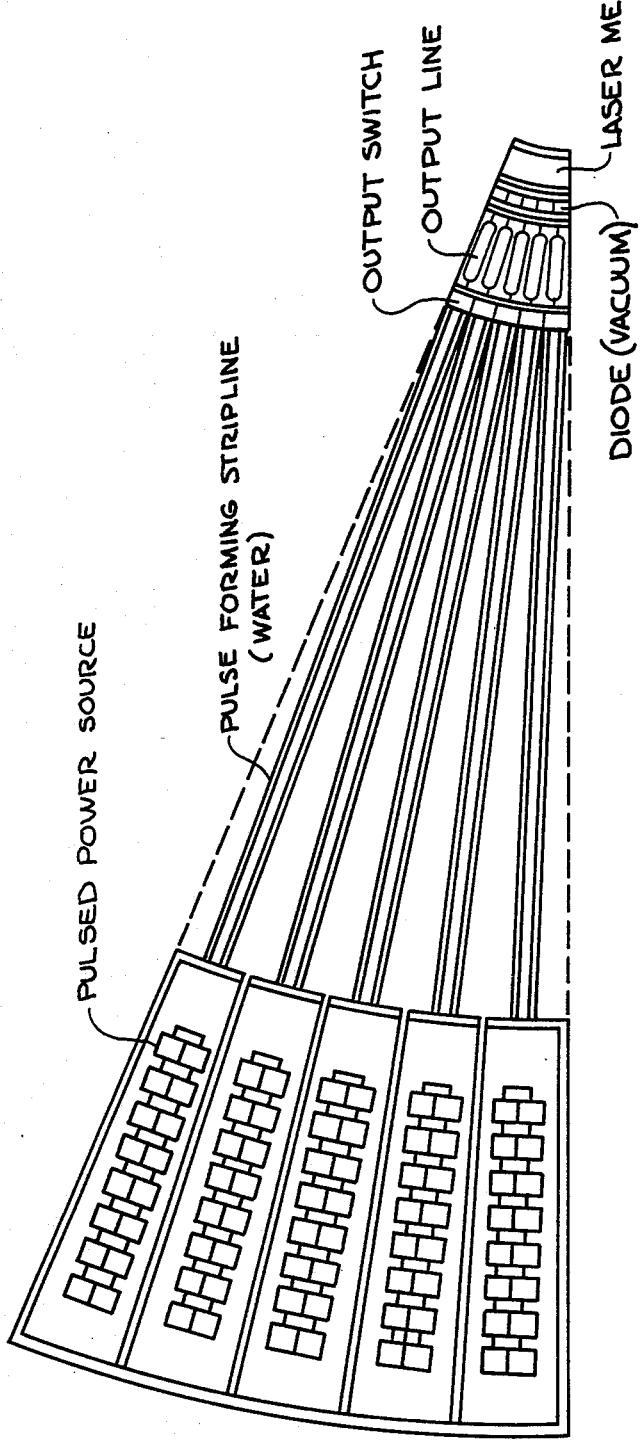
FIG. 18 is a perspective view of the 16-section Raman accumulator as configured for a fusion driver.

The entire laser system is shown in FIG. 18. The compactness of this laser, if realizable, may offer solutions to the real estate and building cost problems that have plagued many of the advanced fusion drivers studied to date. In addition, relaxed constraints on gas recirculation and pulsed power will clearly translate into lower capital and operating costs for this system.

The Raman accumulator offers several advantages related to the method of energy extraction: (1) good pre-pulse isolation; (2) reasonable tolerance of poor input beam quality; (3) avoidance of the use of hard optical apertures and the associated beam diffraction problems; and (4) a compact design, not requiring much real estate for its operation.

The foregoing description of preferred embodiments of the subject invention, presented for purposes of illustration, is not intended to be exhaustive or to limit the invention to the forms disclosed. Variations and modifications may be made without departing from the scope of the invention.

We claim:

1. A Raman accumulator for production of a high power laser pulse, the apparatus comprising:
   a pump amplifier containing a pump amplifier gas and including a fully reflecting mirror at one end thereof, for producing a Raman pump beam of a first characteristic frequency $\nu_p$;
   a first Raman cell containing a first Raman cell gas and positioned to receive the Raman pump beam at one end of the cell and to return the pump beam to the pump amplifier ater extraction of energy the Raman cell gas from the pump beam to convert pump beam energy at frequency $\nu_p$ to energy of a second characteristic frequency $\nu_S$ in the Raman cell and to return the energy-depleted pump beam to the pump beam amplifier for re-amplification, the cell including a fully reflecting mirror positioned at the cell end furthest from the pump amplifier, with the Raman cell being of length L/4 and the overall separation of the pump amplifier mirror and the Raman cell mirror being L;

first dichroic means, incorporated at the end of the Raman cell closest to the pump amplifier so as to transmit end deflect a radiation beam having a characteristic frequency $\nu_S$ by a non-zero angle relative to the direction of propagation of the radiation beam of characteristic frequency $\nu_p$ though the first dichroic means;

a second Raman cell containing a second Raman cell gas, positioned to receive a radiation beam of characteristic frequency $\nu_S$ issuing from the first dichroic means and to return the pulse to the first Raman cell after extraction of energy from the beam by the second Raman cell gas, to convert radiation energy at frequency $\nu_S$ to radiation energy at a third characteristic frequency $\nu_{2S}$, the second Raman cell including a fully reflecting mirror positioned at the second Raman cell end furthest from the first Raman cell, with the second Raman cell being of length $L/4K_{ac}$, with $K_{ac}$ being a predetermined number between 1 and 3, and the path length of travel of a beam from the first Raman cell mirror to the second Raman cell mirror being L/2; and second dichroic means, incorporated at the end of the second Raman cell closest to the first Raman cell so as to deflect a radiation beam having a characteristic frequency $\nu_{2S}$, by a non-zero angle relative to the direction of propagation of a beam having a characteristic frequency $\nu_S$ through the second dichroic means.

2. A Raman accumulator for production of a high power laser pulse, the apparatus comprising:

a pump amplifier containing a pump amplifier gas and having a longitudinal axis and including a fully reflecting mirror at one end thereof, for producing a Raman pump beam of a first characteristic frequency $\nu_p$;

a first Raman cell containing a Raman cell gas and having a longitudinal axis and two fully reflecting side walls substantially parallel to each other and to the longitudinal axis of the Raman cell, with the Raman cell longitudinal axis being oriented at a first predetermined angle $\theta_1 > 0$ relative to the direction of the pump amplifier longitudinal axis, the cell being positioned so that one Raman cell reflecting wall receives the pump beam from the pump amplifier and reflects the pump beam to the second reflecting wall of the first Raman cell, with the pump beam being alternately reflected from the first and second reflecting walls of the first Raman cell until the pump beam exists from he end of the first Raman cell furthest from the pump amplifier, for extraction of energy from the pump beam by the first Raman cell gas to convert pump beam radiation energy of frequency $\nu_p$ to energy of a second characteristic frequency $\nu_p$ and to return the energy-depleted pump beam to the pump beam amplifier for re-amplification;

a first oblique fully reflecting mirror, positioned adjacent to the end of the first Raman cell furthest from the pump amplifier, to receive the pump beam issuing from the first Raman cell end and to reflect the beam at substantially normal incidence and return the pump beam to th Raman cell, with the cumulative reflected path length from the pump amplifier mirror to the first oblique fully reflecting mirror being a predetermined number L and the length of the first Raman cell, measured along the cell longitudinal axis, being L/4;

a first transverse fully reflecting mirror, positioned on the first Raman cell longitudinal axis and oriented substantially perpendicular to that axis, and positioned adjacent to the first oblique mirror so that any radiation beam issuing from the first Raman cell parallel to the cell longitudinal axis is reflected at substantially normal incidence from the first transverse mirror, returns to and propagates through the first Raman cell substantially parallel to the cell longitudinal axis, and exits from the first Raman cell at the cell end closest to the pump amplifier.

a second Raman cell containing a second Raman cell gas having a longitudinal axis and two fully reflecting side walls substantially parallel to each other and to the longitudinal axis of the second Raman cell, with the second Raman cell longitudinal axis being oriented at a second predetermined angle $\theta_2 > 0$ relative to the first Raman cell longitudinal axis, the second Raman cell being positioned so that one reflecting wall of the second Raman cell receives the radiation beam of frequency $\nu_S$ exiting from the first Raman cell and reflects this beam to the second Raman cell second reflecting wall, with this beam being alternately reflected from the first and second reflecting walls of the second Raman cell until the radiation beam exits from the end of the second Raman cell furthest from the first Raman cell, for extraction of energy from this radiation beam by the second Raman cell gas to convert radiation beam energy at frequency $\nu_S$ to energy of a third characteristic $\nu_{2S}$;

a second oblique fully reflecting mirror, positioned adjacent to the end of the second Raman cell furthest from the first Raman cell to receive the radiation beam of frequency $\nu_S$ issuing from that end of the second Raman cell, and to reflect at substantially normal incidence and return that radiation beam to the second Raman cell, with the cumulative reflected path length from the first oblique mirror to the second oblique mirror being a predetermined length $L_1$ and the length of the second Raman cell, measured along the second Raman cell longitudinal axis, being L/4; and a second transverse fully reflecting mirror, positioned on the second Raman cell longitudinal axis with mirror normal at a third predetermined angle $\theta_3$ relative to the second Raman cell longitudinal axis and positioned adjacent to the second oblique mirror, to receive a beam of radiation of frequency $\nu_{2S}$, issuing from one end of the second Raman cell substantially parallel to the longitudinal axis of the cell and to reflect that beam at substantially normal incidence and return it to the second Raman cell for passage therethrough.

3. Apparatus according to claim 2, wherein said pump amplifier gas is drawn from the class consisting of ArF, KrF, XeF, XeCl, $F_2$, FCl and $Cl_2$.

4. Apparatus according to claim 3, wherein said first Raman cell gas and said second Ramon cell gas are drawn from the class consisting of $CH_4$, $SiH_4$ and $GeH_4$.

5. Apparatus according to claim 4, wherein said dichroic means is a mosaic prism.

6. Apparatus according to claim 3, wherein said amplifier gas is drawn from the class consisting of ArF, KrF, XeF, XeCl, $F_2$, FCl and $Cl_2$.

7. Apparatus according to claim 3, wherein said first Raman cell gas is drawn from the class consisting of $CH_4$, $SiH_4$ and $GeH_4$.

8. Apparatus according to claim 3, wherein said first dichroic means or said second dichroic means or both said first and said second dichroic means is a mosaic prism.

9. Apparatus for amplification of electromagnetic radiation according to claim 2, the apparatus comprising:

two or more Raman accumulators constructed according to claim 3, with the radiation beam of frequency $\nu_{2S}$ issuing from said second Raman cell of each Raman accumulator after reflection of the radiation from said second transverse fully reflecting mirror, being directed at a common point in space so that the beams of frequency $\nu_{2S}$ converge substantially radially to a common point;

a plurality of pulsed power sources, one such source being operatively associated with each Raman accumulator, to repetitively produce a pulse of energy to excite said pump amplifier gas of said associated Raman accumulator; and a plurality of pulse forming striplines, one such stripline being operatively associated with said each of said Raman accumulators, to receive a pulse of energy from a pulsed power source and deliver the pulse to said pump amplifier gas of said associated Raman accumulator.

* * * * *